2,876,210

2,2'-DIHYDROXY - 4,4' - SUBSTITUTED BENZO-PHENONES AS ULTRAVIOLET ABSORBENTS FOR GR-A RUBBER

Robert W. Wynn, Easton, Pa., and Paul E. Hoch, Wallingford, Conn., assignors to General Aniline & Film Corporation, New York, N. Y., a corporation of Delaware No Drawing. Application February 10, 1954
Serial No. 409,536

3 Claims. (Cl. 260—45.95)

This invention relates to 2,2'-dihydroxy-4,4'-substituted benzophenones as ultraviolet absorbents for preserving organic substances which tend to deteriorate by the absorption of ultraviolet light.

Various organic compounds exhibit the power to absorb light rays within the band of 2900 to 3700 A., and when uniformly distributed through a transparent plastic sheet, the resultant sheet acts as a filter for all the light rays passing through and will transmit only those waves which are not absorbed by the sheet and/or the absorbing agent. Thus, it is possible to screen out undesirable light rays and utilize the resulting filter in many technical and commercial applications, such as wrapping tissues for food products and the like.

Many organic compounds, such as 2,4'-dihydroxybenzophenone, 2,5-dihydroxybenzophenone, 4,4'-dihydroxybenzophenone, 2,2'-dihydroxybenzophenone, and the like have been suggested as absorbents for ultraviolet light in various transparent plastic sheet materials and the stabilization of transparent plastics.

When 2,5-dihydroxybenzophenone is employed for the protection of polymeric vinylidene chloride products against darkening and embrittling effects of ultraviolet light, considerable discoloration of the product ensues. The 4,4'-isomer is substantially ineffective when employed in the same products for the same purpose, and the 2,2'- and 2,4'-isomers are only slightly effective as ultraviolet absorbers. The latter isomer is ineffective in filter coatings prepared from lacquers containing a cellulose ester, since the filter has a cut-off at about 290 m$\mu$. In other words, the isomer absorbs none of the ultraviolet light of wave length above 330 m$\mu$, and as a consequence the filter containing it is practically transparent to all of the ultraviolet light which is normally present in sunlight at sea level.

2,2'-dihydroxybenzophenone is of limited value in certain types of transparent plastics. While it inhibits the physical breakdown of plastics and other materials in which it is incorporated, it is not satisfactory as a protective material against ultraviolet fading. In other words, this compound is not satisfactory as a protective material against ultraviolet light fading when employed in substantially colorless plastics, resins, film forming materials, colored textiles, and the like. In some cases the colorless plastics and the like coated with said materials containing this compound become colored after several months. In other cases, slightly colored plastics or film forming material is itself discolored when exposed to ultraviolet light, and in still other cases, the plastic or film forming medium offers no protection to the colored object of its transmission of ultraviolet light.

We have discovered that 2,2'-dihydroxy-4,4'-substituted benzophenones, wherein the 4 and 4' substituents are either hydroxy or alkoxy, are not only compatible with various types of substantially colorless film forming plastics, resins, gums, waxes, and the like to yield ultraviolet absorbing compositions, but that their efficiency at 400 m$\mu$ is about twelve times that of any other stable compound currently used as an ultraviolet absorbent.

4-benzoyl resorcinol proposed by the prior art is unique in that it exhibits unusual ultraviolet absorbing properties when incorporated into light transmitting carriers or other compositions which have a tendency to deteriorate by the absorption of ultraviolet light or prolonged exposure thereto without impairing the stability of the carrier or composition in which it is incorporated.

We have discovered that the aforementioned 2,2'-dihydroxy-4,4'-substituted benzophenones are not only compatible (i. e. dispersible or soluble in) with various types of substantially colorless film forming plastics, resins, gums, waxes, etc., but also in any type of organic composition which has a tendency to degrate or discolor by exposure to ultraviolet light. Compounds of this type are especially adaptable to yield ultraviolet absorbing compositions because of their efficiency at 400 m$\mu$ which is about twelve times that of 4-benzoyl resorcinol or any other stable compound currently used as ultraviolet absorbents.

Accordingly, it is an object of the present invention to provide ultraviolet absorbing compositions of matter comprising an organic substance or composition containing, in an ultraviolet absorbing amount, 2,2'-dihydroxy-4,4'-substituted benzophenone.

Another object is to provide a new class of ultraviolet absorbents which, when present in very low concentrations, have the characteristic property of retarding degradation and discoloration of organic substances and compositions which tend to so degrade and discolor upon exposure to ultraviolet light.

Other objects and advantages will appear hereinafter.

The above objects of the present invention are attained by incorporating into an organic substance or composition, an ultraviolet absorbing amount of 2,2'-dihydroxy-4,4'-substituted benzophenone, hereinafter referred to as ultraviolet absorbents. Compounds of this type are advantageously employed in practically any type of organic material which is susceptible to degradation or discoloration such as, for example, rubber compositions comprising india rubber, balata, gutta percha; synthetic vulcanizable products, e. g., polychloroprene, olefin polysulfides, polybutadiene, butadiene-styrene copolymers such as Buna S, butadiene-acrylonitrile copolymers such as Buna N and the like, whether or not the same have been admixed with the conventional fillers, pigment, curing agents and the like. All of these rubber and rubber-like materials are characterized by a high elasticity, indicated by a high percentage of extensibility under load and favorable retraction to approximately original size and shape when the load is removed, and in addition a good tensile strength, good flexure and abrasion resistance, and reactivity with sulfur. The proportion of the ultraviolet absorbent employed may range from 0.1% to 5% and is mixed with rubber or rubber-like material in powder form or in solution in a suitable solvent, such as those subsequently referred to, before vulcanization. Since these ultraviolet absorbents have substantially no accelerating effect, there is no need for adjustment of vulcanizing conditions.

When employed in 1-2% concentration, the ultraviolet absorbents of the present invention not only serve as age-resistors for improving the age-resistance of treated rubber or rubber-like stocks, but also show the unexpected characteristics of providing a very valuable increase in the flex-cracking resistance of the stocks to which they are added.

In white stocks, the ultraviolet absorbents of the present invention, in contrast to many of the commercial ultraviolet absorbents, do not stain the treated rubber or rubber-like stock either when the stocks are exposed to direct sunlight or ordinary diffused light, whereas prior ultraviolet absorbents have the very serious fault of producing a highly objectionable discoloration of the treated rubber stocks under the influence of sunlight.

The ultraviolet absorbents may be employed in any type of drying oil composition, such as paints, enamels, varnishes, etc., as well as in the drying oils such as linseed oil, tung oil, etc., used in their manufacture. Their action in quick drying compositions, such as paints and varnishes is to prevent the breakdown of the film after drying and exposure to light; also discoloration by ultraviolet light of the covered surface.

The ultraviolet absorbents of the present invention mix readily, either by solution or by dispersion, with any type of organic material. If the material to which they are added is a liquid such as essential oils, solutions of dyes or pigments, paints, varnishes, enamels, lacquers, drying oils, colored cellulose ether or cellulose ester dopes, and the like, the ultraviolet absorbent is dissolved in any one or a mixture of the following solvents and the solution thereof mixed with the liquid material. The selection of the proper solvent or mixtures thereof will, of course, depend upon its solubility in or compatibility with the liquid material which can be readily determined by simple routine tests:

Acetone
Ethanol
Propanol
Cellosolve
Dimethyl dioxane
Dioxane
Ether
Ethyl acetate
Methanol
Methyl carbitol If, on the other hand, the material to which the absorbent is added is a solid such as colored soap, rubber, rubber-like materials, film forming plastics such as, cellulose acetate, cellulose formate, cellulose propionate, cellulose butyrate, cellulose acetate-propionate, cellulose acetate-butyrate, cellulose nitrate, polyvinyl chloride, copolymers of vinyl chloride and vinyl acetate, copolymers of vinyl chloride and vinylidene chloride, polyvinylpyrrolidone, various resins, waxes, and the like, the absorbent is incorporated by either milling or mastication in powder form, paste form, solution form, and the like. In the case of cellophane, polyethylene, cellophane (regenerated cellulose) and other sheet plastics employed for covering or packaging various items such as foods, etc., the absorbent may be incorporated into solutions or dopes of such plastic materials. The absorbents in solution form are readily applied to colored textiles, colored objects, such as, color photographs, and oil paintings which are normally exposed for prolonged periods of time to sunlight.

The absorbents are also adaptable for incorporation into various substantially colorless resinous and plastic film-forming materials which are normally cast from solutions, extruded, or laminated into sheets, films, and foils which may be used as such or employed in the preparation of light transmitting carriers as transparent interlayer laminae in safety glass and other structural materials. They are of particular value in the glass fiber, interlayer, laminae, of transparent plastic sheets cast from acrylic resins, phenol-formaldehyde resins, polystyrene resins, cellulose acetate-butyrate, and the like. In this application the glass fiber, laminae, is impregnated with a solution of the absorbent and the fiber allowed to dry prior to lamination.

They are especially adaptable in perfumes, colognes, toilet waters, cosmetics, soaps, creams, ointments, lotions, etc. Many of these preparations because of their coloring matter or dye content fade and discolor by prolonged exposure to sunlight. The addition of the absorbent into such preparations stabilizes them not only from discoloration but also from degradation and deterioration.

In the case of face creams, especially foundation creams for face powders, the absorbent has a beneficial action in preventing sunburn. In lotions they may be employed as tinctures or dispersed in mineral or vegetable oils, with or without the presence of perfumes and/or dyes, and used as sunburn preventives. Ointments prepared from polyvinylpyrrolidone, containing dispersed therein 0.1% to 2% of the absorbent, may be used not only as sunburn preventives but also against harmful radiations of the infra-red type and atomic fission radiations. The base of the ointment, i. e. polyvinylpyrrolidone and the absorbent appear to exert a synergistic effect with respect to infra-red and atomic fission radiations.

Colored soaps are not so much in demand today as white soaps. However, in cases where the soap contains a germicidal or bactericidal compound, pleasing dyes or coloring matters are usually added to mask the germicidal compound employed. For this purpose dyestuffs are generally preferred to pigments. The dyestuffs, such as, for example, Ultramarine blue, Methyl violets, Alizarine or naphthol compounds of chlorophyll, Chrysoidine, diazamine compounds, paramine compounds, Bismuth brown, Saffranine, and the like, however, are unstable upon prolonged exposure to any light containing ultraviolet radiations. In such preparations the ultraviolet absorbents of the present invention are exceedingly beneficial since they inhibit fading and discoloration of the soap. The ultraviolet absorbents also stabilize bath preparations such as bath salts containing dyestuffs, especially basic dyestuffs, such as, Auromine, Acridine orange, Chrysine, Phenyline brown, Methylene blues, basic greens and the like. Of these, the blues and greens are not very stable, and to obtain good results the cosmetician usually resorts to the use of vat dyes. These are added to the saturated solution of the salt whereby the color is absorbed by the crystals when formed. Many of the vat dyes also fade and discolor when exposed to light containing ultraviolet radiations and must be stabilized.

Toilet waters, colognes, perfumes, brilliantines, and the like, containing either vegetable, basic or vat dyes, are readily stabilized against fading and discoloration by the employment of the ultraviolet absorbents of the present invention.

The ultraviolet absorbents of the present invention are uniquely adaptable for the preparations of suntan lotions because of their efficiency at 400 m$\mu$.

The ultraviolet absorbents of the present invention are not only suitable for incorporation into various types of cosmetic preparations, but also into the individual components or constituents of cosmetic preparations, such as, essential oils, for example, Ajowan oil, Rose Geranium, Bitter Almond, Eucalyptus, Ganetheria, Palma Rosa, Anise, Rosemary, Lavender, Sassafras, Angelica and the like, all of which have the tendency to discolor and degrade when exposed for prolonged periods of time to ultraviolet radiations. Their tendency to such degradation is readily minimized and in many cases completely prevented by the addition of a small quantity of ultraviolet absorbents of the present invention.

The proportions of the absorbents or mixtures thereof are not critical and may be employed in concentrations ranging from 1–2%. The exact amount to be employed for any particular composition is readily determinable by trial experiments. For practical purposes we have found that concentrations ranging from 0.1–0.5% based on the weight of the organic composition to be stabilized yield compositions that satisfactorily resist discoloration and degradation when exposed to sunlight. It is to be noted that each type of organic material to be stabilized may require an amount of the absorbent or mixture of absorbents which will differ from a closely analagous material, and as noted above the actual amount employed will depend upon the nature of the material, and the method of dispersion or solution therein readily determined by simple routine tests or trial experiments.

We have prepared compositions containing as much as 10% of the ultraviolet absorbents with excellent stability and by dilution obtained compositions in which the concentration was reduced to 0.1%. The final products also were stable against discoloration and degradation. In other words, these experiments conclusively showed that the amount employed is not critical, and when employed in excess has no deleterious effect in the composition or upon the composition itself. The only exception being when incorporated into compositions, preparations and the like which are normally white, whereby a slight yellowish discoloration is added to such compositions when the amount of the ultraviolet absorption exceeds 5% based on the weight of the material stabilized.

In addition to the foregoing uses, the ultraviolet absorbents may also be employed during the manufacturing steps of preparing artificial yarns, lacquers, molding compositions and impregnated textiles, laminated products, and the like.

The absorbents of the present invention are characterized by the following general formula:

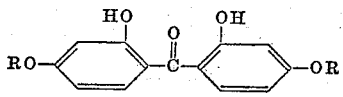

wherein R is hydrogen or alkyl, e. g., methyl, ethyl, propyl, isopropyl, butyl, isobutyl, amyl, isoamyl, hexyl, heptyl, octyl, octadecyl, lauryl and the like.

The compounds characterized by the foregoing general formula are prepared according to the methods disclosed in application, Serial No. 245,643, filed on September 7, 1951, by Wynn and Hoch, for 2,2',4-trihydroxy-4'-alkoxybenzophenones and process of preparing the same, application, Serial No. 214,828 filed on March 9, 1951, by Hoch for 2,2'-dihydroxy-4,4'-dialkoxybenzophenones and the process of preparing the same, and the 2,2',4,4'-tetrahydroxybenzophenone is prepared according to the method of either Meyer and Conzetti in Ber., 30, 969–973 (1897) and Shoesmith and Holdane in J. Chem. Soc., 125, 113 (1924). By reference thereto various specific examples are disclosed and the manner of their preparation. All such disclosed compounds may be employed as such individually or in admixture. We have also found that mixtures containing from 55 to 75% by weight of 2,2',4-trihydroxy-4'-alkoxybenzophenone, 15 to 25% by weight of 2,2'-dihydroxy-4,4'-dimethoxybenzophenone and 10 to 20% by weight of 2,2',4,4'-tetrahydroxybenzophenone are equally as effective as each one of the individual components when employed as ultraviolet absorbents. Such admixtures may be obtained when 2 moles of resorcinol dialkyl ether are allowed to react with 1⅓ moles of phosgene in the presence of 2 moles of aluminum chloride. Care should be taken not to use additional aluminum chloride, since it tends further to dealkylate the dihydroxy component to the trihydroxy component and the trihydroxy component to the tetrahydroxybenzophenone. The mixture of the latter components requires one-twelfth the concentration of 4-benzoyl resorcinol for a 50% transmission cut-off at 400 m$\mu$. In view of this property smaller quantities may be employed ranging from 0.1 to 1%.

Instead of using the mixture obtained by the aforesaid condensation reaction, the individual components as prepared according to the references referred to above may be mixed in the proportions stated. It is to be noted that the mixture and the individual components are equally effective when employed as ultraviolet absorbents in the materials and compositions of the present invention.

The following examples will illustrate the various organic compositions containing the ultraviolet absorbents of the present invention and the mixtures thereof.

EXAMPLE I

*(Toilet water)*

A composition having substantially the following formula:

| | Percent by weight |
|---|---|
| Ethyl alcohol (95%) | 54.800 |
| Perfume oil | 1.000 |
| 2,2',4-trihydroxy-4'-methoxybenzophenone | 0.005 |
| Water | 42.395 |
| Glycerine | 1.800 |
| Blue dye | Trace |
| Yellow dye | Trace | is made up as follows:

A conventional violet type perfume oil and 2,2',4-trihydroxy-4'-methoxybenzophenone were dissolved in the alcohol base. The water and glycerine were weighed together and slowly added to the alcohol-perfume- and 2,2',4-trihydroxy-4'-methoxybenzophenone mixture. The desired colors in the conventional small proportions were then added and the toilet water composition was chilled and filtered.

After 20 hours exposure in the fadeometer the product showed little change in color. A control sample containing all the other ingredients except the 2,2',4-trihydroxy-4'-methoxybenzophenone faded completely under the same conditions.

EXAMPLE II

*(Perfume)*

A composition having substantially the following formula:

| | Percent by weight |
|---|---|
| Ethyl alcohol (95%) | 87.995 |
| Perfume oil | 12.000 |
| 2,2',4-trihydroxy-4'-ethoxybenzophenone | 0.005 |
| Blue dye | Trace |
| Yellow dye | Trace | was made up by essentially the same method as described in Example I. This perfume composition displayed a high order of stability despite the exposure in a fadeometer.

EXAMPLE III

*(After-shave lotion)*

A composition having substantially the following formula:

| | Percent by weight |
|---|---|
| Ethyl alcohol (S. D. 40) | 54.800 |
| Perfume oil | 0.500 |
| 2,2',4-trihydroxy-4'-methoxybenzophenone | 0.005 |
| Boric acid | 0.250 |
| Water | 42.445 |
| Glycerine | 2.000 |
| Blue dye | Trace |
| Yellow dye | Trace | was made up essentially as in Example I except that the boric acid component was first added to the water with the glycerine. This composition showed excellent color stability in the fadeometer.

EXAMPLE IV

*(Brilliantine)*

A brilliantine of the following formula:

| | Percent by weight |
|---|---|
| Propylene glycol monolaurate | 5.00 |
| 2,2',4-trihydroxy-4'-methoxybenzophenone | 0.20 |
| Perfume | 1.13 |
| Mineral oil (a refined white oil) | 89.67 |
| Yellow dye (0.1% solution in mineral oil) | 2.00 |
| Orange dye (0.1% solution in mineral oil) | 2.00 | was prepared as follows:

The 2,2',4-trihydroxy - 4' - methoxybenzophenone and perfume were dissolved in the propylene glycol monolaurate, and the resulting mixture was then dissolved in the mineral oil whereupon the two dyes were introduced into the mixture and stirred. After 24 hours in the fadeometer the brilliantine remained clear and the color changed only very slightly.

EXAMPLE V (Anti-sunburn lotion)

A composition having substantially the following formula:

| | Percent by weight |
|---|---|
| Glycerine | 40.00 |
| Water | 40.00 |
| Ethyl alcohol (95%) | 15.00 |
| Tragacanth | 2.00 |
| Agar-agar | 1.00 |
| 2,2',4-trihydroxy-4'-methoxybenzophenone | 2.00 | was prepared as follows:

The gun tragacanth and agar-agar were soaked with the water until a mucilaginous body was obtained. The benzophenone was dissolved in ethyl alcohol and the solution poured into the mucilaginous body and the whole stirred until a uniform composition was obtained. Thereafter the glycerine was added with stirring to the composite solution. The composition in actual application to the human skin filtered ultraviolet light and prevented sunburn. It is non-toxic and non-irritating to the skin.

EXAMPLE VI (Anti-sunburn cream)

A composition having substantially the following formula:

| | Percent by weight |
|---|---|
| White wax | 20.00 |
| Cocoa butter | 10.00 |
| Lanolin, anhydrous | 15.00 |
| Peanut oil | 50.00 |
| Moldex | 1.00 |
| Perfume oil | 2.00 |
| 2,2',4-trihydroxy-4'-methoxybenzophenone | 2.00 | was prepared as follows:

The white wax, cocoa butter and lanolin were gently melted by the application of heat to a liquid stage. The benzophenone, perfume oil and Moldex were then added to the peanut oil and gently heated until solution was effectuated. This solution was then added to the liquefied mixture of wax, cocoa butter and lanolin. When applied to the skin as a sunburn cream it showed the same characteristics as in Example V. In addition, the composition when applied to the skin allowed sweating to take place.

EXAMPLE VII (Lacquer)

A composition having substantially the following formula:

| | Percent by weight |
|---|---|
| Nitrocellulose | 6.00 |
| Ethyl alcohol | 9.00 |
| Toluene | 23.00 |
| Butanol | 6.00 |
| Ansol | 10.00 |
| Ethyl lactate | 3.00 |
| Ethyl acetate | 25.00 |
| A. D. M. No. 100 oil | 10.00 |
| Carnauba wax | 6.00 |
| 2,2'-dihydroxy-4,4'-dimethoxybenzophenone | 2.00 | was prepared as follows:

A solution of the benzophenone in ethyl acetate containing the carnauba wax was added to the nitrocellulose dope containing the remainder of the ingredients. The solution was stirred and a portion thereof cast on a polished metallic surface. After drying the foil showed excellent ultraviolet absorbent properties, and after 24 hours in the fadeometer remained clear without any yellowing.

EXAMPLE VIII (Dope for casting transparent ultraviolet absorbing film)

A composition having substantially the following formula:

| | Percent by weight |
|---|---|
| Cellulose acetate | 15.00 |
| Triphenyl phosphate | 3.75 |
| Methyl Cellosolve | 28.69 |
| Absolute ethyl acetate | 38.21 |
| Absolute ethyl alcohol | 14.00 |
| 2,2',4,4'-tetrahydroxybenzophenone | 0.35 | was prepared by dissolving the benzophenone in methyl Cellosolve and incorporating the solution into the dope of the cellulose acetate containing the remainder of the ingredients. Upon casting a foil was obtained which when subjected to the fadeometer for 1000 hours showed no discoloration, whereas a similar foil containing no benzophenone showed marked discoloration after 20 hours.

EXAMPLE IX (Ultraviolet light absorbing cellulose acetate varnish)

A composition having substantially the following formula:

| | Percent by weight |
|---|---|
| Cellulose acetate | 10.00 |
| Acetone | 30.00 |
| Methyl propionate | 48.00 |
| Ethyl alcohol | 8.00 |
| Diethylene glycol | 2.00 |
| 2,2'-dihydroxy-4,4'-dimethoxybenzophenone 21<br>2,2',4-trihydroxy-4'-methoxybenzophenone 64<br>2,2',4,4'-tetrahydroxybenzophenone 15 | 2.00 | was prepared by dissolving the mixture of benzophenones in 2 parts by weight of diethylene glycol and 10 parts methyl propionate. The solution was then incorporated into the dope of cellulose acetate containing the remainder of the ingredients.

The dope solution was then stirred and a small portion thereof cast into a film. The film was subjected to a fadeometer and showed no discoloration after 1000 hours.

While we have disclosed the preferred embodiments of our invention, it will be readily appreciated by those skilled in the art that many changes and variations may be made therein without departing from the spirit thereof. Accordingly, the scope of the invention may be limited solely by the appended claims.

We claim:

1. An ultraviolet absorbent composition of matter comprising butadiene-acrylonitrile copolymer, which normally tends to deteriorate and degrade by exposure to ultraviolet radiations, having uniformly dispersed therein from 0.1 to 5% by weight of at least one ultraviolet absorbing compound selected from the group consisting of 2,2',4,4'-tetrahydroxybenzophenone and 2,2'-dihydroxy-4,4'-dialkoxybenzophenone.

2. An ultraviolet absorbent composition of matter according to claim 1 wherein the ultraviolet absorbing compound is 2,2'-dihydroxy-4,4'-dimethoxybenzophenone having the following formula:

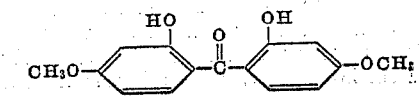

3. An ultraviolet absorbent composition of matter according to claim 1 wherein the ultraviolet absorbing compound is 2,2',4,4'-tetrahydroxybenzophenone having the following formula:

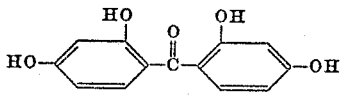

References Cited in the file of this patent

UNITED STATES PATENTS

| | | |
|---|---|---|
| 2,614,940 | Freyermuth et al. | Oct. 21, 1952 |
| 2,686,812 | Wynn | Aug. 17, 1954 |
| 2,693,492 | Hoch | Nov. 2, 1954 |

OTHER REFERENCES

Shoesmith: Journal of the Chemical Society, vol. 125 (1924), pages 113 to 115.

Hackh's Chemical Dictionary, The Blakiston Co., Philadelphia, 3rd ed., 1944, page 412.

Giese: American Perfumer and Essential Oil Review, September 1950, page 198.